United States Patent [19]

Babbitt, II

[11] Patent Number: 5,265,484
[45] Date of Patent: Nov. 30, 1993

[54] SENSOR RETAINING BRACKET

[75] Inventor: Albert B. Babbitt, II, Bloomfield Hills, Mich.

[73] Assignee: Ford Motor Company, Dearborn, Mich.

[21] Appl. No.: 806,409

[22] Filed: Dec. 13, 1991

[51] Int. Cl.$^5$ .............................................. G01D 11/20
[52] U.S. Cl. ................................... 73/866.5; 248/225.1
[58] Field of Search ............... 73/866.5, 1 J; 33/502, 33/556, 558; 248/225.1, 285.1, 274

[56] References Cited

U.S. PATENT DOCUMENTS

| | | | |
|---|---|---|---|
| 2,544,312 | 3/1951 | Hamilton | 248/210 |
| 2,589,042 | 3/1952 | Brenneman | 29/227 |
| 3,785,058 | 1/1974 | Egli | 33/502 X |
| 3,926,395 | 12/1975 | Lallemant | 248/222.2 |
| 4,078,779 | 3/1978 | Mölders | 92/18 X |
| 4,211,110 | 2/1980 | Glomski | 73/865.9 X |
| 4,289,244 | 9/1981 | Frankhauser et al. | 248/297.3 X |
| 4,310,172 | 1/1982 | Claude et al. | 280/703 |
| 4,543,732 | 10/1985 | Maples | 33/502 |
| 4,555,120 | 11/1985 | Frait et al. | 280/6.1 |
| 4,631,831 | 12/1986 | Bacher et al. | 33/558 X |
| 4,658,969 | 4/1987 | Matrdicasa | 211/187 |
| 4,706,368 | 11/1987 | Crissman et al. | 248/229 X |
| 4,723,765 | 2/1988 | Pearson | 188/300 X |
| 4,744,548 | 5/1988 | Hathaway | 267/64.12 |
| 4,778,156 | 10/1988 | Imaizumi et al. | 267/64.21 |
| 4,813,100 | 3/1989 | King | 267/64.12 X |
| 4,832,299 | 5/1989 | Gorton et al. | 248/231.7 |
| 4,836,578 | 6/1989 | Soltis | 267/64.16 |
| 4,890,703 | 1/1990 | Hathaway | 188/300 |
| 4,930,340 | 6/1990 | Evans | 73/1 J |
| 4,949,573 | 8/1990 | Wolfe et al. | 73/118.1 |
| 5,161,764 | 11/1992 | Raney | 248/231.7 |

Primary Examiner—Tom Noland
Attorney, Agent, or Firm—Raymond L. Coppiellie; Clifford L. Sadler

[57] ABSTRACT

An elongate bracket for temporarily fixing a sensor in a predetermined position is disclosed wherein the sensor includes a first member telescopically slidable within a second member. The bracket includes a projecting member at one end of the bracket which fits into an aperture in the first member and a tab at the opposite end of the bracket which contacts the second member of the sensor. The bracket includes a mechanism responsive to a beam stress imposed upon the bracket when the bracket is fixed to the sensor so that upon either an extension or retraction of the first member relative to the second member, the beam stress causes the bracket to be forced away from the sensor to permit relative movement between the first and second members of the sensor.

9 Claims, 3 Drawing Sheets

SENSOR RETAINING BRACKET

BACKGROUND OF THE INVENTION

1. Field of the Invention

The present invention relates generally to a bracket for locking a sensor into a predetermined position. More particularly, the present invention relates to a bracket for temporarily locking an automotive height sensor into a predetermined position during the manufacture of the vehicle.

2. Disclosure Information

Automotive height sensors determine the distance between the sprung and unsprung vehicle masses and send an electronic signal to a suspension control module which determines whether to increase or decrease the vehicle ride height. For example, in an air suspension system, the module maintains proper vehicle ride height (vehicle "trim") by regulating the air pressure in the air springs. It is essential that the height sensors are calibrated when the vehicle is manufactured to assure proper vehicle height measurement.

To assure proper operation of the suspension system, the height sensor signal must correspond to the vehicle ride height. This can be accomplished during manufacture of the vehicle by holding the vehicle suspension at the trim height while the sensor attachment points are adjusted to the trim dimension. One method for assuring that the sensor attachment points are at the correct trim position is to lock the height sensor in a predetermined position prior to its installation in the vehicle. After the height sensor is attached to the vehicle at the sensor attachments, the attachments can be tightened into position to ensure that the vehicle is in trim when the sensor is at its trim position.

Various methods of locking the height sensor into a predetermined position have been proposed. For example, U.S. Pat. No. 4,555,120 proposes to ultrasonically spot weld the height sensor shaft to the sensor housing to temporarily lock the sensor components in a predetermined position prior to installation into the vehicle. Upon installation, the weld is broken upon a compression of the shaft relative to the sensor housing.

U.S. Pat. No. 4,930,340 proposes the use of a retaining bracket which temporarily locks the sensor shaft in a predetermined relationship to the sensor housing. The bracket includes a pair of apertures which fit over a respective pair of bosses on the sensor housing and the sensor shaft to hold the sensor components in a predetermined position. After installation of the height sensor into the vehicle, the bracket of the '340 patent is stripped from the sensor upon an extension of the sensor shaft from the housing and a successive retraction of the shaft into the housing. As fully described in the '340 patent, the bracket will not automatically strip from the bracket unless both the extension and retraction of the sensor is completed. However, it is not always possible during the manufacturing of the vehicle to subject the height sensor to an extension followed by a successive retraction. In such cases, the retaining bracket of the '340 patent will not automatically strip from the sensor, making it necessary for an operator to physically remove the bracket from the sensor.

Therefore, there is a need for a bracket which temporarily locks a sensor into a predetermined position which can be automatically stripped away from the bracket upon either an extension or a retraction of the sensor shaft relative to the sensor housing. It is an object of the present invention to provide such a bracket.

SUMMARY OF THE INVENTION

In one aspect of the present invention, the problems described above are solved by an apparatus for temporarily fixing a sensor in a predetermined position, the sensor having a first member telescopically slidable within a second member, the apparatus comprising an elongated bracket. The bracket includes a projecting member at one end adapted to fit into an aperture in the first member of the sensor as well as a tab disposed at an opposite end of the bracket and adapted to contact the second member of the sensor. The bracket further includes an elongate slot interposed between the projecting member and the tab of the bracket which includes means for releasably engaging a locking pin projecting from the second member of the sensor so that when the locking pin engages the means, the first and second members are fixed in a predetermined relationship, and upon either an extension or retraction of the first member relative to the second member, the bracket is forced away from the sensor to permit relative movement between the first and second members of the sensor. The tab of the bracket projects from a longitudinal axis of the bracket at a distance greater than does the projecting member of the bracket so that a beam stress is imposed upon the bracket when the locking pin engages the releasable engaging means.

Therefore, it is a feature of the present invention that the bracket can be designed to automatically strip from the sensor under a predetermined force. It is a further feature of the bracket of the present invention that the bracket can be manufactured to be calibrated for a specific removal force.

It is an advantage of the present invention that the bracket may be manufactured at a low cost and may easily be assembled to a height sensor prior to its installation into a vehicle.

These and other features, objects and advantages of the present invention will become apparent from the detailed description, claims and drawings which follow.

DETAILED DESCRIPTION OF THE PREFERRED EMBODIMENT

Figure 1:
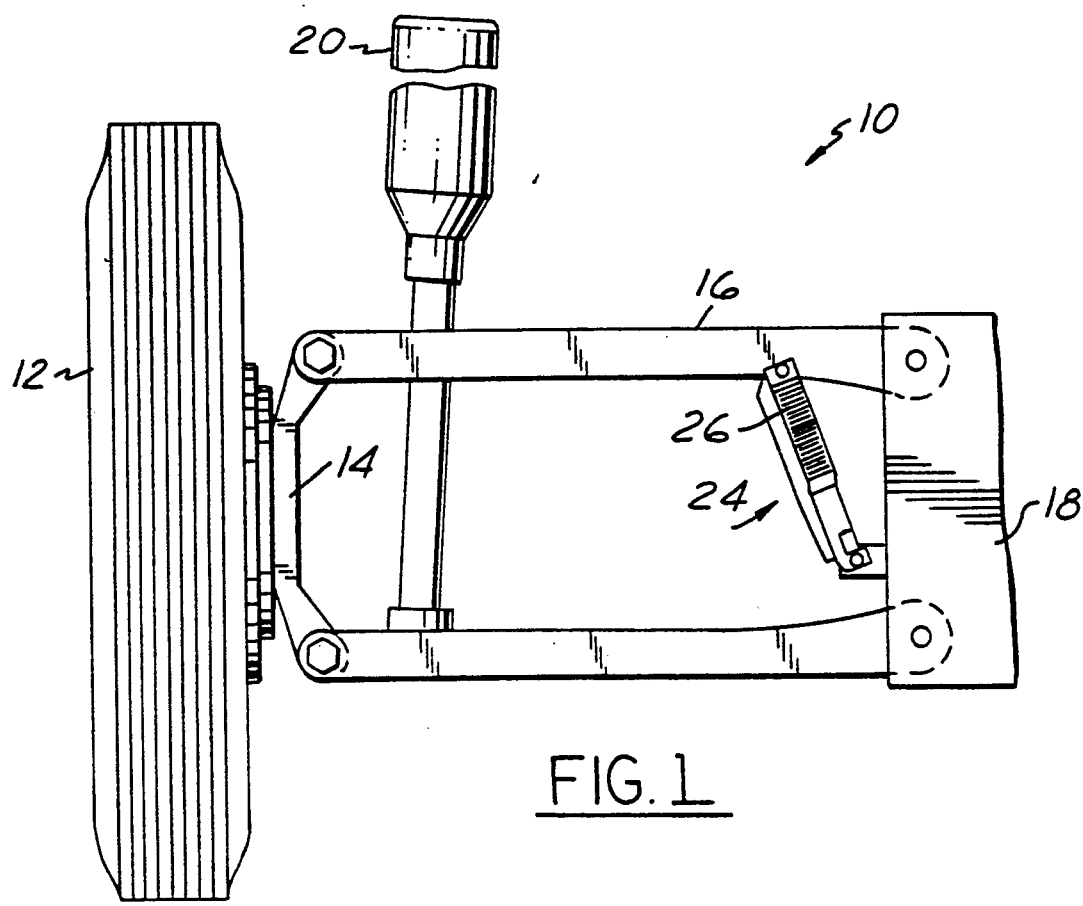
FIG. 1 is a perspective view of a vehicle having a height sensor disposed between the sprung and unsprung vehicle masses and having a locking bracket of the present invention secured thereto.

Referring now to the drawings, FIG. 1 shows a portion of a vehicle 10 including a wheel and tire assembly 12 rotatably supported upon a wheel carrier 14. It should be apparent to those skilled in the art that FIG. 1 represents only one vehicle wheel, it being understood that the vehicle includes a symmetrical configuration disposed on the opposite side of the vehicle which is not shown. A suspension control arm 16 is pivotally connected to the wheel carrier 14 at its outboard end and to the body or chassis 18 of the vehicle at its inboard end. The vehicle 10 further includes an adjustable suspension unit 20 which may have adjustable damping or adjustable load carrying capabilities or both. A height sensor assembly 24 is interposed between the suspension control arm 16 and the vehicle chassis 18. The height sensor assembly includes a height sensor 26 which may comprise a linear variable differential transformer (hereinafter "LVDT"), a Hall Effect device or one of a variety of other devices suitable for generating a signal representing the vertical position of the wheel and tire assembly 12 as the wheel and tire move through jounce and rebound directions. The height sensor 26 may also be an analog type, generating an exact signal corresponding to each position of the wheel and tire assembly 12 with respect to the body or chassis 18 of the vehicle as opposed to known digital sensors which generate a logic "1" or "0" as the wheel and tire assembly 12 pass through specific jounce, trim or rebound defined areas. Other types of position sensors, comprising either variable resistance, variable reluctance, variable capacitance or Hall Effect sensors or other type of sensors known to those skilled in the art and suggested by this disclosure may be utilized as well.

In order to maintain the vehicle at a predetermined ride height, such as a trim ride height, three height sensor assemblies are commonly employed on the vehicle, two at the front of the vehicle at each vehicle wheel and one at the rear of the vehicle. The three sensors generate a signal representative of the distance between the vehicle wheel and tire assembly and the vehicle body or chassis to define a reference Plane used by the suspension control module in determining whether to activate the adjustable suspension units to keep the vehicle at a predetermined ride height. It is necessary that each of the sensors be held in a predetermined position corresponding to the actual vehicle height position during the manufacture of the vehicle so that a suspension control module within the vehicle is calibrated properly with respect to height sensor measurements. In the arrangement shown in FIG. 1, during the manufacture of the vehicle, the vehicle is held in a predefined position so that the suspension control arm 16 is in proper position for installation of the height sensor assembly 24. The height sensor assembly may be secured to the vehicle frame or chassis 18 in any number of known methods, such as by adjustable ball stud assemblies as will be described below. The height sensor assembly 24 may also be installed by other known manufacturing procedures, such as disclosed in U.S. Pat. No. 4,930,340, the disclosure of which is hereby incorporated by reference.

Figure 2:
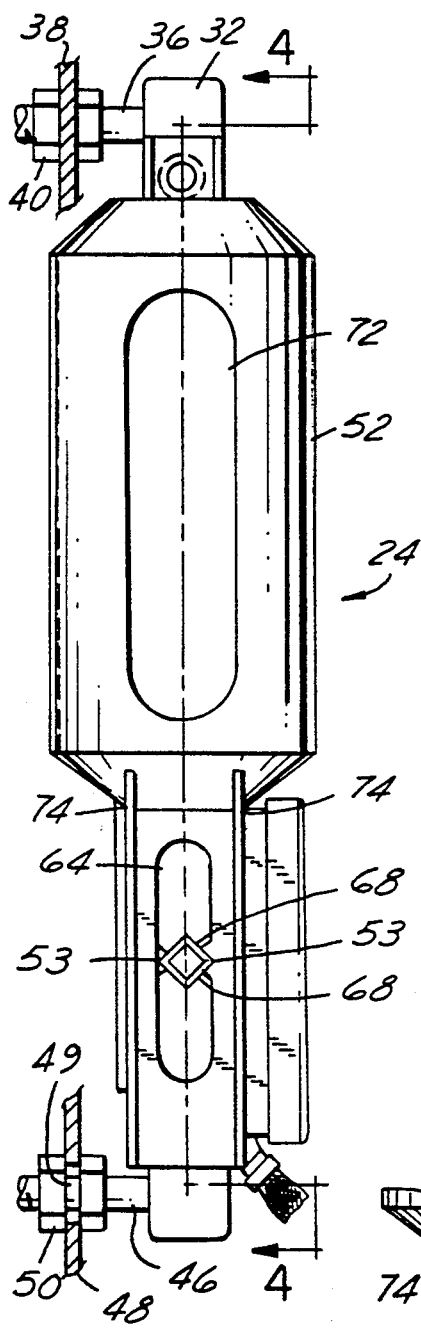
FIG. 2 is a front elevational view of the height sensor and bracket of FIG. 1.
Figure 2A:
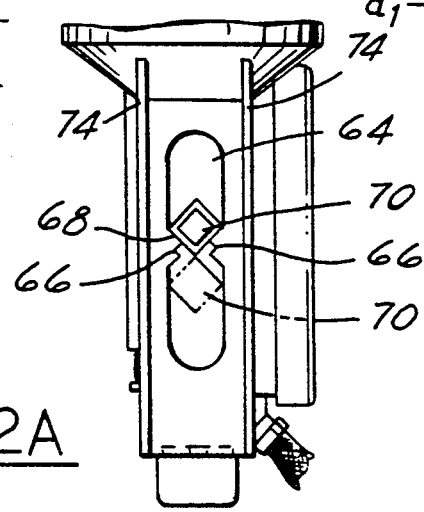
FIG. 2A is an enlarged view of a portion of the height sensor and bracket of FIG. 2 in an unlocked position.
Figure 3:
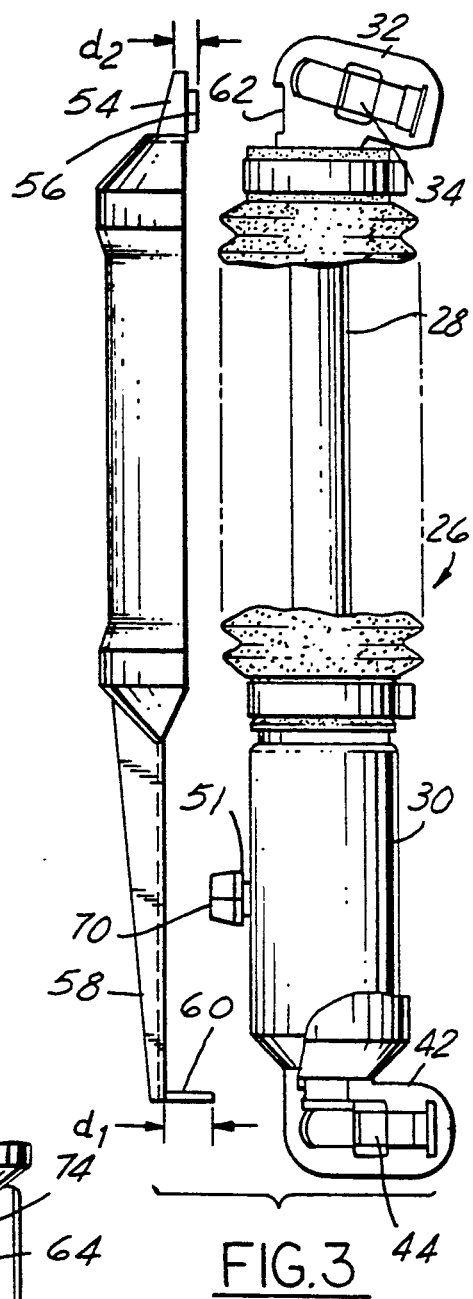
FIG. 3 is an exploded view of the bracket and height sensor of FIG. 2.

As can be seen in FIGS. 2, 2A and 3, the sensor assembly 24 includes a height sensor 26 having a housing 30 and a shaft 28 which telescopically slides within the housing 30 upon movement of the wheel and tire assembly 12 relative to the vehicle chassis 18. The shaft 28 of the height sensor 26 includes an anchoring lug 32 having a socket 34 which receives the head of a ball stud 36 therein. The ball stud 36 is secured to a bracket 38 by a pair of nuts 40. The bracket 38 is fixed to the suspension control arm 16. Similarly, the housing 30 of the height sensor 26 includes a second anchoring lug 42 having a socket 44 for receiving the head of a second ball stud 46 therein. The ball stud 46 is secured to a bracket 48 by adjustable nuts 50. The bracket is fixed to the vehicle chassis or body 18. The bracket 48 includes a vertical slot 49 in which the stud position is adjustable. After the lug 32 is snapped over its respective ball-shaped head 36, the stud 46 is positioned in its slot to enable the second lug 42 to be snapped over the ball-shaped head of stud 46. Thereafter, nuts 50 are tightened to lock the stud 46 in position. As will be described below, bracket 52 locks the sensor shaft 28 and housing 30 into a predetermined position during this assembly procedure, thus insuring that the ball studs are tightened in proper position.

The sensor housing 30 also includes a locking pin 51 projecting perpendicularly therefrom for engaging a locking bracket. The locking pin 51 includes an orthogonal-shaped head 70 having diametrically opposed corner portions 53. A pair of flat surfaces depend from each corner portion. The width of head 70 of pin 51 is greater than the shank of the pin to provide positive engagement with the locking bracket 52 and to facilitate easy removal of the bracket 52 from the height sensor assembly 24.

In order to keep the sensor housing 30 and shaft 30 in a fixed, predetermined position during installation and manufacture of the vehicle, the sensor assembly 24 is provided with the bracket 52 as shown. The bracket 52 is an elongate member having an upper portion 54 with a projecting member 56 projecting therefrom and a lower portion 58 having a tab 60 projecting therefrom. The projecting member 56 engages an aperture 62 formed in the anchoring lug 32 of the sensor shaft 28 while the tab 60 contacts the anchoring lug 42 of the sensor housing 30 in an interference-type fit. It is advantageous to provide an interference fit between member 56 and aperture 62 as well to minimize the relative movement of bracket 52 with respect to the sensor 26 when in the assembled position. As can be seen in FIG. 3, the tab 60 projects from a longitudinal axis of the bracket 52 by a distance $d_1$. The projecting member 56 projects from the longitudinal axis a distance of $d_2$ which is less than the distance $d_1$. In this manner, when the bracket 52 is fixed to the height sensor 26, a beam stress is imposed on the bracket 52 as will be described below.

Those skilled in the art will realize that the beam stress imposed on bracket 52 resulted from the different lengths of projecting member 56 and tab 60 relative to a reference plane. It is important to realize that since member 56 and tab 60 are separated from the locking pin 51 by different distances, the resulting lever arms produced at each end of the bracket (as shown in appropriate force balancing diagrams) cause the beam stress upon the bracket 52. The present invention is not meant to be limited solely to an embodiment wherein the beam stress imposed upon bracket 52 results from the different lengths of projecting member 52 and tab 60.

Figure 5:
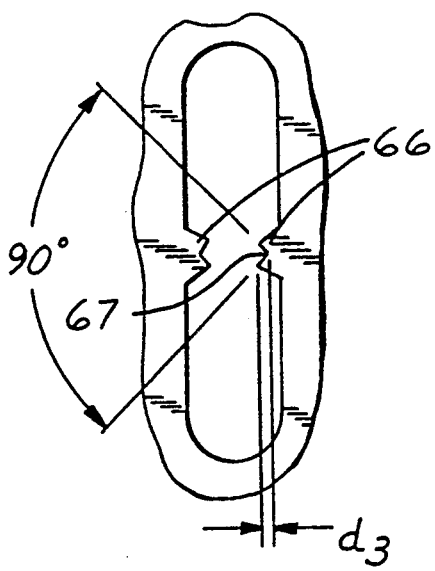
FIG. 5 is an enlarged view of a lower portion of the locking bracket structured in accord with the principles of the present invention.
Figure 5A:
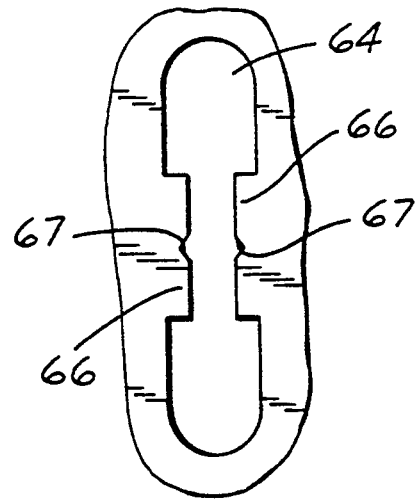
FIG. 5A is an enlarged view of an alternative embodiment of the lower portion of the locking bracket of the present invention.

As can be seen in FIGS. 2A and 5, the lower portion 58 of bracket 52 includes an elongate slot 64 having a pair of opposed teeth 66 formed therein. The teeth are separated by a predetermined distance and each tooth includes a notch 67 of predetermined depth. The notches 67 open inwardly with respect to the slot 64 at approximately a 90 degree angle. As shown in FIG. 2, the teeth 66 matingly engage the corner portions 53 of the head 70 of the locking pin 51 projecting from the sensor housing 30. It should be apparent to those skilled in the art that other angular openings may be used in the notches as well, such as that shown in FIG. 5A. In the embodiment of FIG. 5A, the teeth portions 66' are widened to prevent the breaking of the teeth during the removal process.

Figure 4:
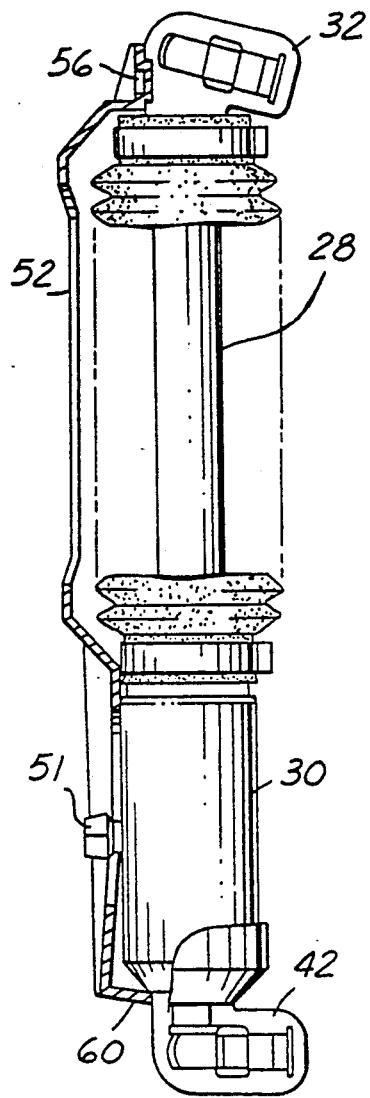
FIG. 4 is a cross-sectional view of the bracket and sensor according to the present invention taken along 4—4 of FIG. 2 showing the bracket and sensor in the locked position.

To fit the bracket 52 on the height sensor 26, the projecting member 56 is placed into the aperture 62 of the shaft 28 and the teeth 66 of the elongated slot 64 are placed over the head 70 of the locking pin 51. A force is then applied to the bracket 52 to force the corner portions 53 of head 70 of the locking pin 51 through the notches 67 of the teeth 66, which causes a beam stress upon the bracket 52 as can be more clearly seen in FIG. 4. As a result of the beam stress, a retraction or extension of the sensor housing 30 relative to the shaft 28 causes the flat surfaces 68 of the locking pin 51 to ride along the surfaces of notches 67 of teeth 66 to force the locking pin 51 out of engagement with the teeth 66. The beam stress imposed on the bracket 52 during the installation on the sensor 26 causes the bracket 52 to be automatically forced away from the sensor 26. This is an improvement over prior art devices requiring both an extension of the shaft followed by a successive retraction of the shaft since it may not always be possible to subject the height sensor to both movements in that order. The bracket of the present invention may also be stripped away from the sensor by an operator.

The bracket 52 of the present invention may be calibrated to be stripped from the sensor under a predetermined force. As shown in FIG. 5, by simply varying the distance $d_3$ of the teeth 66 parallel to the edge of the elongated slot 64, the amount of force necessary to remove bracket 52 from the sensor 26 can be modified. For example, a larger $d_3$ increases the force necessary to remove the bracket from the sensor while a smaller $d_3$ makes it easier for the bracket to be stripped. As such, the present invention comprises an improvement to prior devices whereas it was not possible to vary the necessary force required to remove the bracket from the sensor.

The locking bracket of FIGS. 2-5 is arcuate in cross-section and includes a second elongate slot 72 provided solely for economic saving of material. The bracket 52 may be manufactured from a variety of synthetic polymeric materials having a resiliency therein for providing a reactive force to the beam stress imposed when the bracket is locked on the sensor. The bracket may also include a pair of support ribs 54, 74 disposed on the upper and lower portions of the bracket, respectively, for added stability. The bracket may be placed onto the sensor at the point of manufacturer of the sensor before shipment to the automotive vehicle manufacturer or may be placed onto the sensor immediately prior the installation to the vehicle by an operator.

Figure 6:
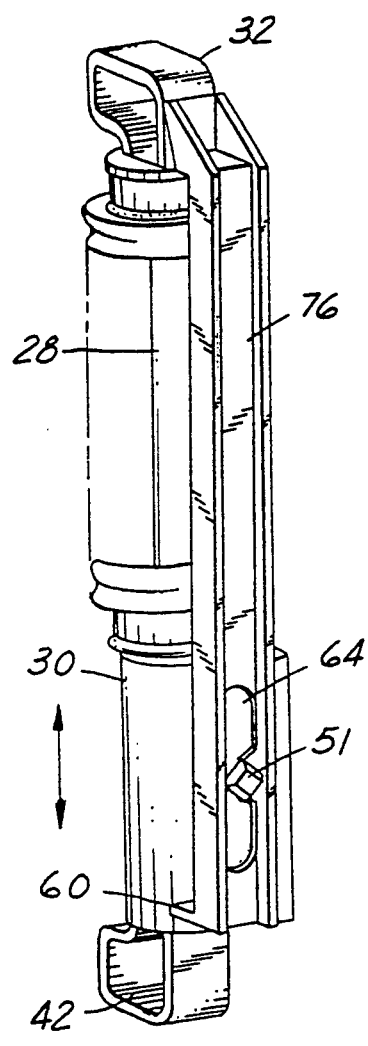
FIG. 6 is an alternative embodiment of the locking bracket of the present invention.
Figure 7:
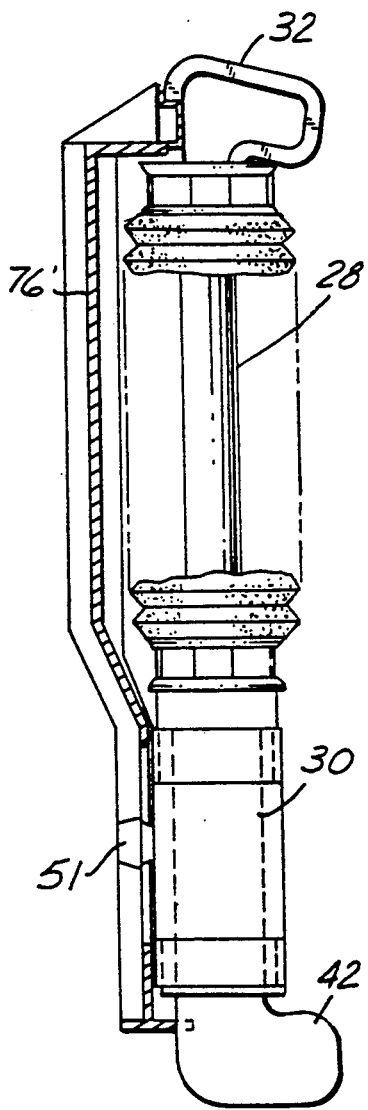
FIG. 7 is an alternative embodiment of the locking bracket of the present invention.

FIGS. 6 and 7 show alternative embodiments of a locking bracket used with a height sensor for temporarily locking the height sensor shaft into a fixed Position relative to the sensor housing. The bracket 76 of FIG. 6 is beam-shaped as opposed to the arcuate shape shown in FIGS. 2-5. By varying the thickness and width of the bracket 76, different beam stresses can be imposed to regulate the necessary force required to strip the bracket from the vehicle. The bracket 76' of FIG. 7 is angled to conform more closely to the dimensions of the height sensor.

It should be readily apparent to those skilled in the art that many variations and modifications of the present invention are possible. It is the following claims, including all equivalents, which define the scope of my invention.

What is claimed is:

1. An apparatus for temporarily fixing a sensor in a predetermined position, said sensor having a first member telescopically slidable within a second member, said apparatus comprising an elongated bracket including
   a projecting member at one end of said bracket adapted to fit into an aperture in said first member;
   a tab disposed at an opposite end of said bracket and adapted to contact said second member of said sensor; and
   an elongate slot interposed between said first projecting member and said tab of said bracket and including means for releasably engaging a locking pin projecting from said second member of said sensor so that when said locking pin engages said means, said first and second members are fixed in a predetermined relationship, and upon either an extension or retraction of said first member relative to said second member, said bracket is forced away from said sensor to permit relative movement between said first and second members of said sensor.

2. An apparatus according to claim 1, wherein said means for releasably engaging a locking pin comprises a pair of opposed teeth disposed in said slot and separated by a predetermined distance, each tooth of said pair defining a notch of predetermined depth and opening inwardly with respect to said slot.

3. An apparatus according to claim 2, wherein said locking pin includes a pair of corner portions received in locking engagement with said notches of said teeth, said corner portions having flat surfaces depending therefrom and adapted for sliding engagement with the sides of said notches.

4. An apparatus according to claim 1, wherein said tab projects from a longitudinal axis of said bracket at a distance greater than does said projecting member so that a beam stress is imposed upon said bracket when said locking pin engages said releasable engaging means.

5. An apparatus according to claim 1, wherein said first member comprises a shaft of said sensor.

6. An apparatus according to claim 5, wherein said second member comprises a housing.

7. A bracket for temporarily fixing a sensor in a predetermined position, said sensor having a first member telescopically slidable within a second member having a locking pin projecting therefrom, said bracket comprising:
   a projecting member at one end of said bracket adapted to fit into an aperture in said first member;
   a tab disposed at an opposite end of said bracket and adapted to contact said second member of said sensor, said tab projecting from a longitudinal axis of said bracket at a distance greater than does said projecting member so that a beam stress is imposed upon said bracket when said bracket engages said locking pin; and
   means responsive to said beam stress imposed upon said bracket for releasably engaging said locking pin so that when said locking pin engages said means, said first and second members are fixed in a predetermined relationship, and upon either an extension or retraction of said first member relative to said second member, said beam stress causes said bracket to be forced away from said sensor to permit relative movement between said first and second members of said sensor.

8. A bracket according to claim 7, wherein said means responsive to said beam stress includes an elongate slot interposed between said first projecting member and said tab of said bracket, said slot including a pair of opposed teeth separated by a predetermined distance, each tooth of said pair defining a notch of predetermined depth and opening inwardly with respect to said slot.

9. A bracket according to claim 8, wherein said locking pin includes a pair of corner portions received in locking engagement with said notches of said teeth, said corner portions having flat surfaces depending therefrom and adapted for sliding engagement with the sides of said notches.

* * * * *

UNITED STATES PATENT AND TRADEMARK OFFICE
CERTIFICATE OF CORRECTION

PATENT NO. : 5,265,484
DATED : November 30, 1993
INVENTOR(S) : Albert B. Babbitt III It is certified that error appears in the above-identified patent and that said Letters Patent is hereby corrected as shown below:

On the cover sheet below item [19] should read as shown:

--Babbitt III--.

On the cover sheet item [75] should read as shown:

--Inventor: Albert B. Babbitt III, Bloomfield Hills, Mich.--

Signed and Sealed this

Fourteenth Day of June, 1994

Attest:

BRUCE LEHMAN

Attesting Officer

Commissioner of Patents and Trademarks